Figure 1:
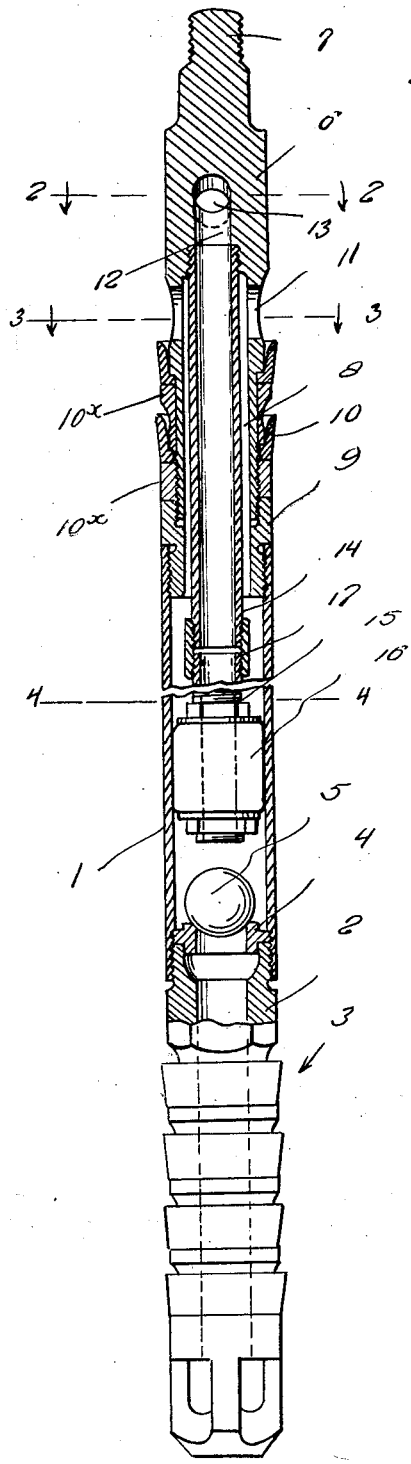

Nov. 22, 1927.　　　　　　　　　　　　　　　　1,649,865
F. G. SITES
SAND TRAP
Filed Jan. 25, 1927

Inventor
F. G. Sites,

By Clarence A. O'Brien
Attorney

Patented Nov. 22, 1927.

1,649,865

UNITED STATES PATENT OFFICE.

FLORIEN G. SITES, OF BURKBURNETT, TEXAS.

SAND TRAP.

Application filed January 25, 1927. Serial No. 163,442.

This invention relates to an improved sand trap adapted for use in association with an oil well pump, and the same is more particularly adapted for connection with the traveling valve of the working barrel.

It is well known that the oil passing upwardly through the pump, carries with it considerable sand and grit, which particles are unduly detrimental to the packing cups. The result is that the life of these cups is comparatively short, making replacement necessary at rather frequent intervals.

My object is to provide a novel trap construction for automatically collecting the sand and separating it from the oil with a view toward reducing wear upon the cups.

The invention is characterized by exceptional simplicity of construction, novel assembly, maintenance of parts and inexpensiveness of manufacture and employment.

In the drawings:—

Figure 1 is a broken view showing the complete structure and all parts properly assembled.

Figure 2:
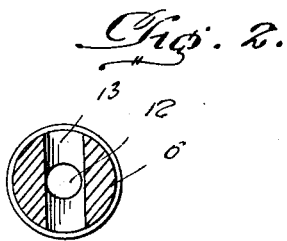
Figure 3:
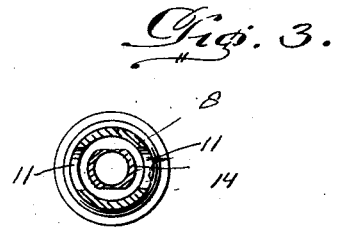
Figure 4:
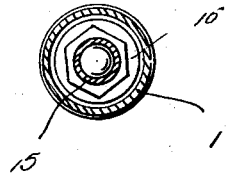

Figs. 2, 3 and 4 are cross sections taken on the lines 2—2, 3—3, and 4—4 respectively of Fig. 1.

Referring now to the drawings in detail, it will be observed that the reference character 1 designates a length of tubing which is open and internally screw threaded at its opposite ends. Tapped into the lower end is a centrally bored fitting 2 provided with customary packing cups 3. Cooperating with the inner end of the fitting 2 is a valve seat ring or plate 4 with which the ball check valve 5 cooperates.

Referring now to the upper end of the construction, it will be noted that the reference character 6 designates a special end member provided with a screw threaded shank 7 at its upper end for the connection of a suitable operating rod. The lower end of this member 6 is in the form of a sleeve 8 connected with a tubular coupling 9 which is inturned and threaded in the upper end of the tube 1. This sleeve 8 is surrounded by packing rings 10 which surmount collars 10ˣ on the sleeve. Above the packing rings and in the sleeve 8 are opposite apertures 11. Above these, is a bored discharge passage 12 in the member 6 opening into a transverse port 13. This port 13 serves to discharge the oil, from which the sand has been extracted, into the working barrel, (not shown).

At this point, I would call attention to the fact that the lower end of the bore 12 is screw threaded and a pipe section 14 is threadedly connected therewith. On the lower end of this pipe section is a complemental pipe section 15 carrying packing 16 snugly fitting within the tubing 1 and held in place by retaining nuts. These two pipe sections are connected together by an appropriate coupling 17. Also as shown better in Fig. 3, the diametrically opposite sides of the first-named pipe section 14 are flattened in order to increase the size of the spaces between themselves and the inner wall of the aforesaid sleeve 8.

With the arrangement described, it is obvious that the sand laden fluid enters the cage equipped fitting 2 then passes upwardly and unseats the ball check valve 5. It then passes upwardly through the pipe sections 15 and 14 respectively, and outwardly through the bores 12 and 13, after which the sand passes inwardly through the apertures 11 and owing to the spaces provided on opposite sides of the upper pipe section by the flattened side walls, the sand gravitates through the said spaces and settles in the chamber formed between the packing 16, the tubing 1, and the lower end of the coupling 9. The operation described will be better understood when it is stated that the fluid is discharged through the apertures or bores 13, strikes the side of the working barrel, not shown, and is deflected downwardly toward the upper packing cup. This action washes the sand off or from the upper packing cup and through the apertures 11 whereupon the sand is enabled to settle into the sand trap formed between the sleeve 8 and the pipe section 14.

It is thought that by considering the description in connection with the drawings, a clear understanding of the invention will be had. Therefore, a more lengthy description is thought unnecessary.

Minor changes coming within the field of invention claimed may be resorted to if desired.

Having thus described my invention, what I claim as new is:—

1. In a sand trap for oil well pumps and in combination, a tube, a valved fitting carried at the lower end of the tube, an end member carried at the upper end of the tube and having a sleeve connected to the tube and also having an upwardly and laterally extending bore; the upper portion of the sleeve being apertured at a point spaced below said lateral bore, packing on the sleeve below the apertured portion thereof, a pipe carried by the end member in communication with the said bore thereof and extending through and spaced from said sleeve, and packing on the pipe and in the tube and disposed below the said sleeve.

2. In a sand trap for oil well pumps and in combination, a tube, a valved fitting carried at the lower end of the tube, an end member, said end member having an upwardly and laterally extending bore and also having a sleeve, said sleeve threaded at its lower end and apertured at a point spaced below the lateral bore, a coupling interposed between and connecting the upper end of the tube and the lower end of the sleeve of the end member, packing rings secured on the sleeve of the end member, the upper of said packing ring being arranged with its upper edge flush with the aperture in the sleeve, a pipe connected to the end member and communicating with the upwardly extending bore thereof and arranged in and spaced from the sleeve, and packing on the said pipe and disposed in the tube below the said coupling.

In testimony whereof I affix my signature.

FLORIEN G. SITES.